US012802699B2

(12) United States Patent
Yang et al.

(10) Patent No.: US 12,802,699 B2
(45) Date of Patent: Nov. 17, 2026

(54) METHOD FOR DETECTING DISTORTIONS OF SPEECH SIGNALS AND INPAINTING THE DISTORTED SPEECH SIGNALS

(71) Applicant: HARMAN INTERNATIONAL INDUSTRIES, INCORPORATED, Stamford, CT (US)

(72) Inventors: Ruiting Yang, Shenzhen (CN); Xiang Deng, Shenzhen (CN); Jie Zhao, Shenzhen (CN)

(73) Assignee: Harman International Industries, Incorporated, Stamford, CT (US)

( * ) Notice: Subject to any disclaimer, the term of this patent is extended or adjusted under 35 U.S.C. 154(b) by 172 days.

(21) Appl. No.: 18/612,841

(22) Filed: Mar. 21, 2024

(65) Prior Publication Data

US 2024/0331714 A1 Oct. 3, 2024

(30) Foreign Application Priority Data

Mar. 27, 2023 (CN) ........................ 202310308381.9

(51) Int. Cl.
*G10L 21/0208* (2013.01)

(52) U.S. Cl.
CPC ................................ *G10L 21/0208* (2013.01)

(58) Field of Classification Search
CPC ............. G10L 21/0208; G10L 21/0216; G10L 2021/02165; G10L 15/02; H04R 3/005
USPC .......................................................... 704/226
See application file for complete search history.

(56) References Cited

U.S. PATENT DOCUMENTS

| | | | | |
|---|---|---|---|---|
| 2020/0234712 A1* | 7/2020 | Epstein | .................. | G10L 15/02 |
| 2022/0060812 A1 | 2/2022 | Ganeshkumar | | |
| 2023/0164480 A1 | 5/2023 | Xue et al. | | |

FOREIGN PATENT DOCUMENTS

| | | | | |
|---|---|---|---|---|
| CN | 116964964 A * | 10/2023 | ............... | H04R 3/00 |
| WO | 2017/048470 A1 | 3/2017 | | |
| WO | 2022/016533 A1 | 1/2022 | | |
| WO | 2022/026481 A1 | 2/2022 | | |

* cited by examiner

*Primary Examiner* — Md S Elahee
(74) *Attorney, Agent, or Firm* — Artegis Law Group, LLP

(57) ABSTRACT

The present disclosure provides a method for detecting distortions of speech signals and inpainting the distorted speech signals. The method includes: detecting whether there is a first distortion caused by clipping in an in-air speech signal from an in-air microphone; detecting whether there is a second distortion caused by a non-speech pseudo signal in an in-ear speech signal from an in-ear microphone; inpainting, in response to detecting the first distortion, the in-air speech signal with the first distortion using the in-ear speech signal; and inpainting, in response to detecting the second distortion, the in-ear speech signal with the second distortion using the in-air speech signal.

21 Claims, 10 Drawing Sheets

METHOD FOR DETECTING DISTORTIONS OF SPEECH SIGNALS AND INPAINTING THE DISTORTED SPEECH SIGNALS

CROSS-REFERENCE TO RELATED APPLICATIONS

The present application claims the benefit of Chinese Patent Application titled, "METHOD FOR DETECTING DISTORTIONS OF SPEECH SIGNALS AND INPAINTING DISTORTED SPEECH SIGNALS" filed on Mar. 27, 2023, and having Application No. 202310308381.9. This related application is hereby incorporated by reference in its entirety.

TECHNICAL FIELD

The present disclosure relates generally to speech processing in communication products, and in particular to a method for detecting distortions of speech signals and inpainting the distorted speech signals.

BACKGROUND

With the continuous development of earphone devices and related technologies, earphone devices have been widely used for speech communication between users (earphone wearers). How to ensure the quality of speech communication in various usage environments is an issue worthy of attention. Typically, an earphone device may include one or a plurality of sensors for capturing the user speech/speech, such as a microphone. However, in actual use, distortion caused by various conditions may significantly degrade the quality and intelligibility of speech/speech data captured by the sensor. Moreover, processing the distorted speech data will be a huge challenge.

Therefore, it is necessary to provide an improved technology to overcome the above shortcomings, thereby improving some functions that rely on speech signals, such as speech detection, speech recognition, and speech emotion analysis. At the same time, it also provides a better listening experience for a user at a remote end of the communication.

SUMMARY OF THE INVENTION

One aspect of the present disclosure provides a method for detecting distortions of speech signals and inpainting the distorted speech signals. The method includes: detecting whether there is a first distortion caused by clipping in an in-air speech signal from an in-air microphone; detecting whether there is a second distortion caused by a non-speech pseudo signal in an in-ear speech signal from an in-ear microphone; inpainting, in response to detecting the first distortion, the in-air speech signal with the first distortion using the in-ear speech signal; and inpainting, in response to detecting the second distortion, the in-ear speech signal with the second distortion using the in-air speech signal.

Another aspect of the present disclosure provides a system for detecting distortions of speech signals and inpainting the distorted speech signals. The system includes a memory and a processor. The memory has computer-readable instructions stored thereon. When the computer-readable instructions are executed by the processor, the method described herein can be implemented.

DESCRIPTION OF THE DRAWINGS

The present disclosure can be better understood by reading the following description of non-limiting implementations with reference to the accompanying drawings, wherein.

DETAILED DESCRIPTION

Figure 1:
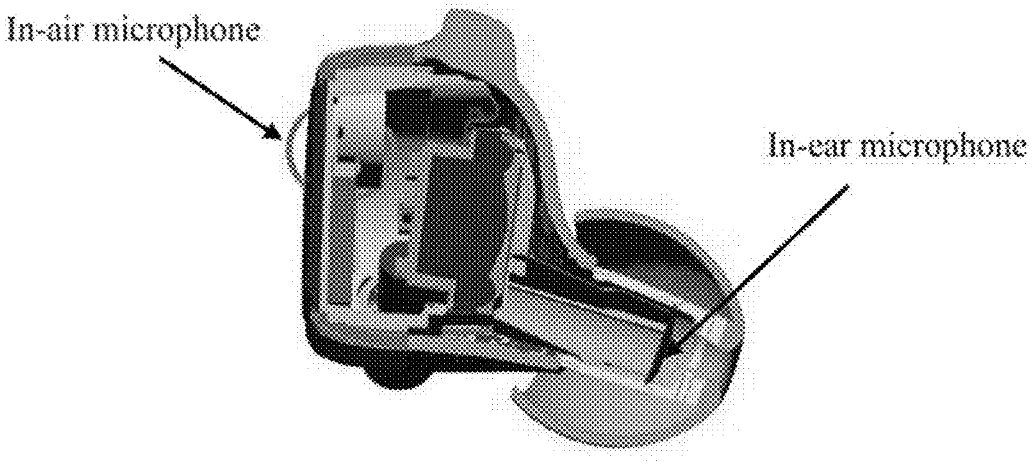
FIG. 1 exemplarily shows a schematic diagram of locations of microphones in an earphone.

It should be understood that the following description of the embodiments is given for illustrative purposes only, and not restrictive.

The use of singular terms (for example, but not limited to "a") is not intended to limit the number of items. The use of relational terms such as, but not limited to, "top", "bottom", "left", "right", "upper", "lower", "downward", "upward", "side", "first", "second" ("third", and the like), "entrance", "exit", and the like shall be used in writing for the purpose of clarity in the reference to the Appended Drawings and not for the purpose of limiting the scope of the claims disclosed or enclosed in the present disclosure, unless otherwise stated. The terms "include" and "such as" are descriptive rather than restrictive, and unless otherwise stated, the term "may" means "can, but not necessarily". Notwithstanding any other language used in the present disclosure, the embodiments illustrated in the drawings are examples given for purposes of illustration and explanation and are not the only embodiments of the subject matter herein.

Typically, an earphone may include one or a plurality of sensors for capturing the user speech/words, such as a microphone. FIG. 1 shows an example of microphones at different locations in an earphone. As can be seen from FIG. 1, there are two microphones provided at the part of the earphone inserted into the ear and the part exposed to the air. FIG. 1 shows only two microphones for illustration purposes for simplicity. It is understandable that the present disclosure is not limited by the appearance of the earphone, the number of microphones, and specific locations of microphones shown in FIG. 1.

For ease of explanation, the microphone arranged at the part of the earphone inserted into the ear is referred to as an in-ear microphone, and the microphone arranged at the part of the earphone exposed to the air as an in-air microphone herein. Here, a signal from the in-air microphone may be referred to as an "in-air signal" (that is, an air-propagating signal), an "in-air microphone signal", or an "in-air speech signal"; and a signal from the in-ear microphone may be referred to as an "in-ear signal", an "in-ear microphone signal", or an "in-ear speech signal". Here, the terms "in-air signal", "in-air microphone signal", and "in-air speech signal" are interchangeable, and the terms "in-ear signal", "in-ear microphone signal", and "in-ear speech signal" are interchangeable.

The in-air microphone and the in-ear microphone in the earphone may have different signal channels. In use, a signal captured from speech of a wearer of the earphone may be distorted in one channel while maintaining good quality in another channel.

Through observation and analysis, the inventor noticed two distortion problems affecting the earphone signal. One type of distortion problem is signal distortion caused by improper gain settings, hardware issues, or even external noise/vibration/sound (such as strong wind blowing against the microphone). This distortion usually appears in a signal collected by the in-air microphone, and its main manifestation is that the signal exceeds the maximum allowable value designed by a device or system, resulting in clipping. The other type of distortion problem is signal distortion caused by some special noise or vibration captured by the in-ear microphone and caused by human non-speech activities (including mouth movements, swallowing, and teeth occlusion (collision)). This distortion usually appears in an in-ear signal collected by the in-ear microphone, and is mainly manifested as peaks in a time domain waveform of the signal. Therefore, in the present disclosure, the two types of distortion problems are mainly focused on and solved. Specific situations of the two types of distortions will be discussed separately below.

First, the problem of clipping distortion that occurs in an in-air microphone signal is discussed. Clipping is a non-linear process, and the associated distortion may severely impair the quality and intelligibility of the audio. The impact of clipping on the system (component) is that when the maximum response of the system is reached, the output of the system remains at the maximum level even if the input is increased. The speech signal received by the in-air microphone in the earphone may be clipped. When the amplitude of the speech signal received by the in-air microphone is higher than a certain threshold, it will be recorded as a constant or recorded according to a given model. There are three main types of clipping conditions, each caused by a different reason.

The first type of clipping condition is double clipping. In the clipping condition, the portions of the signal amplitude that exceed a positive threshold and a negative threshold (also known as a high threshold and a low threshold) will be clipped. This condition is usually caused by improper gain settings.

The second type of clipping condition is single clipping. In the clipping condition, the amplitude of the signal only exceeds a threshold at one side (a positive or negative side), and the portion exceeding the threshold will be clipped. This condition is usually caused by signal drifting due to hardware problems.

The third type of clipping condition is soft clipping. This condition is usually observed after the clipped signal has undergone another processing, such as applying a DC blocker to the signal in the first or second clipping condition.

Figure 2:
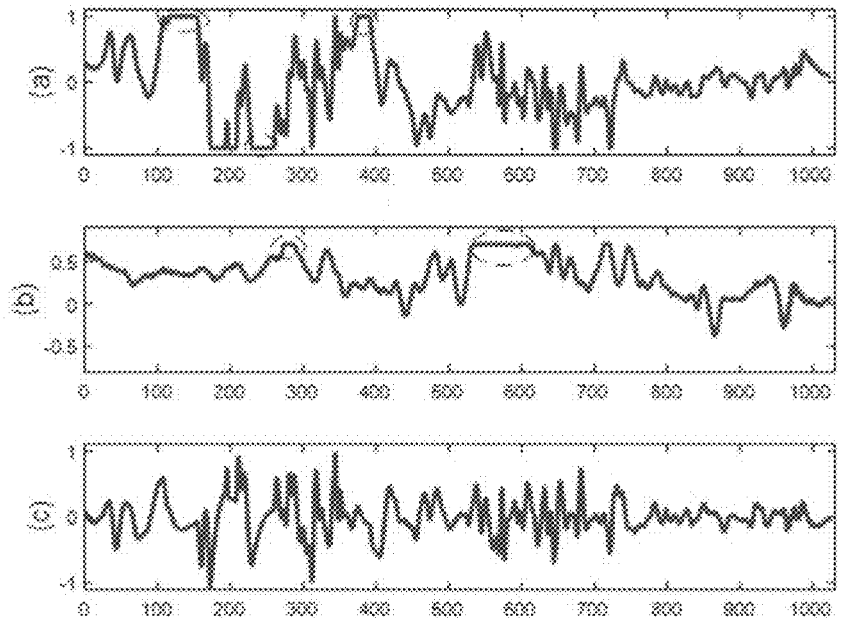
FIG. 2 exemplarily shows a schematic waveform graph of three types of clipped speech signals.

FIG. 2 shows a schematic exemplary waveform (time-amplitude) graph corresponding to a clipped signal in the clipping condition discussed above, wherein the signal is an example of a speech signal collected by an in-air microphone. A picture (a) shows an exemplary waveform graph of a clipped signal in the case of double clipping. A picture (b) shows an exemplary waveform graph of a clipped signal in the case of single clipping. A picture (c) shows an exemplary waveform graph of a clipped signal in the case of soft clipping, wherein the signal waveform shown is a waveform of a signal obtained by applying a DC blocking filter to the signal in the picture (a).

In practice, another reason for clipping is that the in-air microphone receives unexpectedly very strong noise (for example, wind noise) and it causes part of the amplitude of a mixed signal after the speech/speech signal is mixed with the noise exceeds a threshold. In order to facilitate the explanation of clipping here, the speech/speech signal, noise, and signal mixed with noise are respectively expressed as: $s(t)$, $n(t)$, and $x(t)$, then the relationship between the three signals may be expressed as $x(t)=s(t)+n(t)$.

For example, when the clipping amplitude threshold is $\theta_T$, the in-air microphone signal that may be clipped can be expressed as:

$$y(t) = \begin{cases} x(t), & \text{if } x(t) < \theta_T \\ \text{sign}(x(t)) \cdot \theta_T, & \text{if } x(t) \geq \theta_T \end{cases} \quad (1)$$

Figure 3:
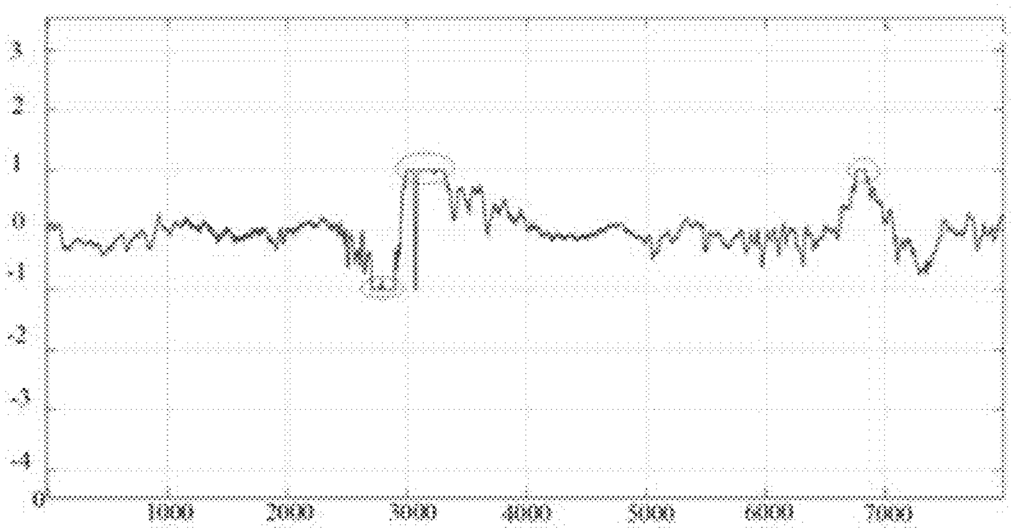
FIG. 3 exemplarily shows a clipped speech signal caused by strong wind noise from an in-air microphone in an earphone.
Figure 4:
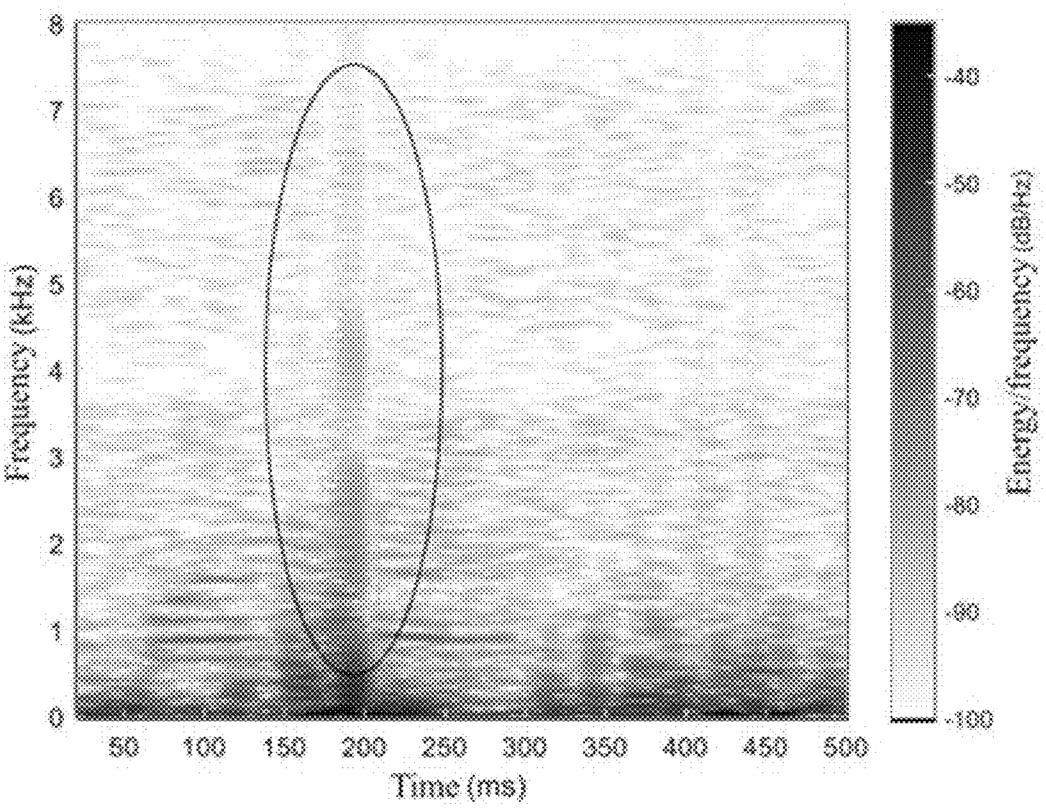
FIG. 4 exemplarily shows a frequency spectrum of a segment of clipped speech signal caused by strong wind noise.

FIG. 3 shows a clipped speech signal caused by strong wind noise from an in-air microphone in an earphone. FIG. 4 exemplarily shows a segment of frequency spectrum of a clipped speech signal caused by strong wind noise. Specifically, the example shown in FIG. 4 shows a frequency spectrum corresponding to a signal recorded in a clipping period around approximately an index 3000 in a sample sequence ID in FIG. 3. As shown in FIG. 4, the speech signal is contaminated by clipping, wherein strong wind noise with a speed of about 3 m/s is recorded, harmonic structures of vowels are not obvious and the clipping creates masking across the entire frequency band. An ellipse in FIG. 4 indicates a portion of the signal frequency spectrum that is significantly contaminated. This sounds like "pop" or "click" and is a very unpleasant sound experience for a listener (that is, a user on the remote end of the communication).

As for in-ear microphones, they mainly suffer from another kind of signal distortion. In-ear microphones are commonly used in various earphone devices, such as an earphone with an active noise cancellation (ANC) function. Since the in-ear microphone is inserted into the ear and can well isolate environmental noise, and human speech can be received through bone and tissue conduction, the in-ear microphone can usually capture a speech signal with a high signal-to-noise ratio (SNR). Additionally, the in-ear microphone may pick up the output of a speaker placed close to it, and therefore, the gain of the microphone is usually set appropriately (smaller). Because the audio signal received by the in-ear microphone from the speaker is likely to be much stronger than the received speech of the earphone wearer, clipping less likely occurs in the in-ear microphone.

However, the in-ear sensor may capture some special noises or vibrations caused by some human non-verbal activities, including mouth movements, swallowing, and teeth occlusion (collision). These special noises may cause an unpleasant listening experience and affect other functions of the in-ear microphone, such as speech activity detection. Therefore, this special noise needs to be studied.

Vibrations are generated by some non-verbal activity in the mouth and are transmitted through the skull to the inner ear. These noises are not sounds produced by the sound-producing system. Therefore, the in-air microphone will not capture loud, meaningful, and significant corresponding sound signals. These signals captured by the in-ear microphone sound like "popping," and they may affect other functions that use the in-ear microphone signal, such as speech activity detection.

Figure 5:
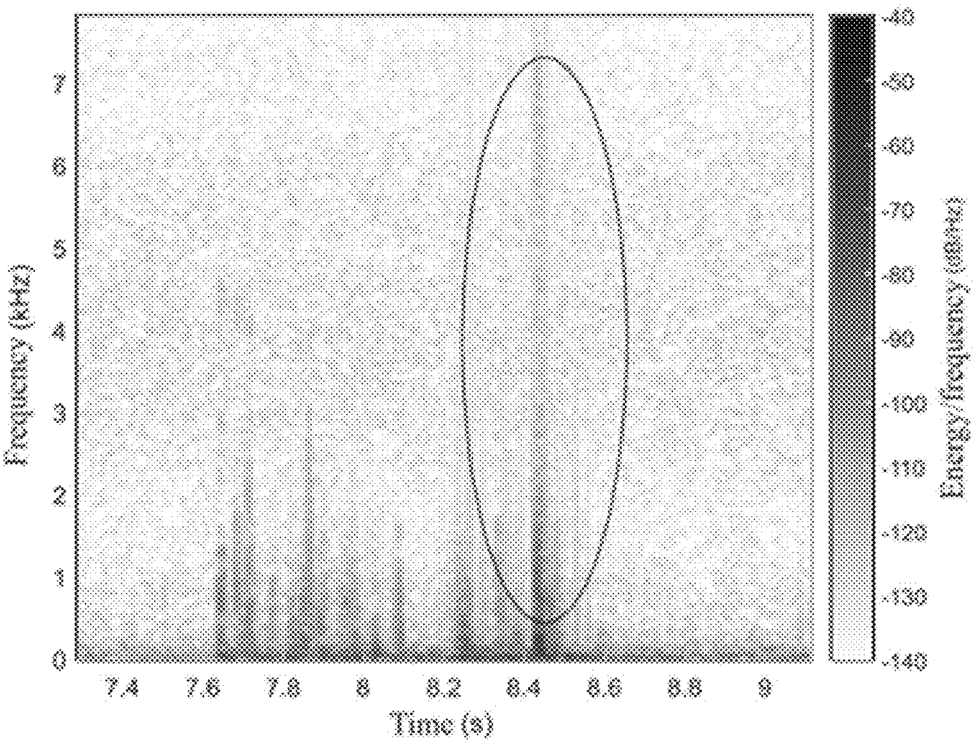
FIG. 5 exemplarily shows a frequency spectrum of a segment of in-ear microphone signal collected during opening and closing of the mouth.
Figure 6:
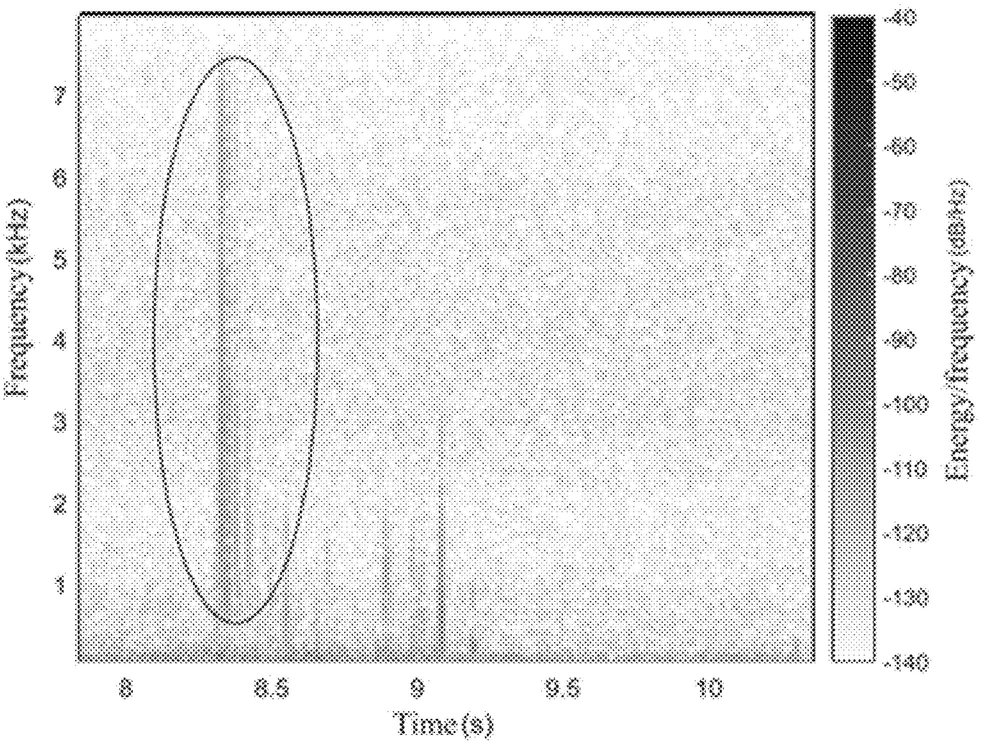
FIG. 6 exemplarily shows a frequency spectrum of a segment of in-ear microphone signal collected during swallowing.
Figure 7:
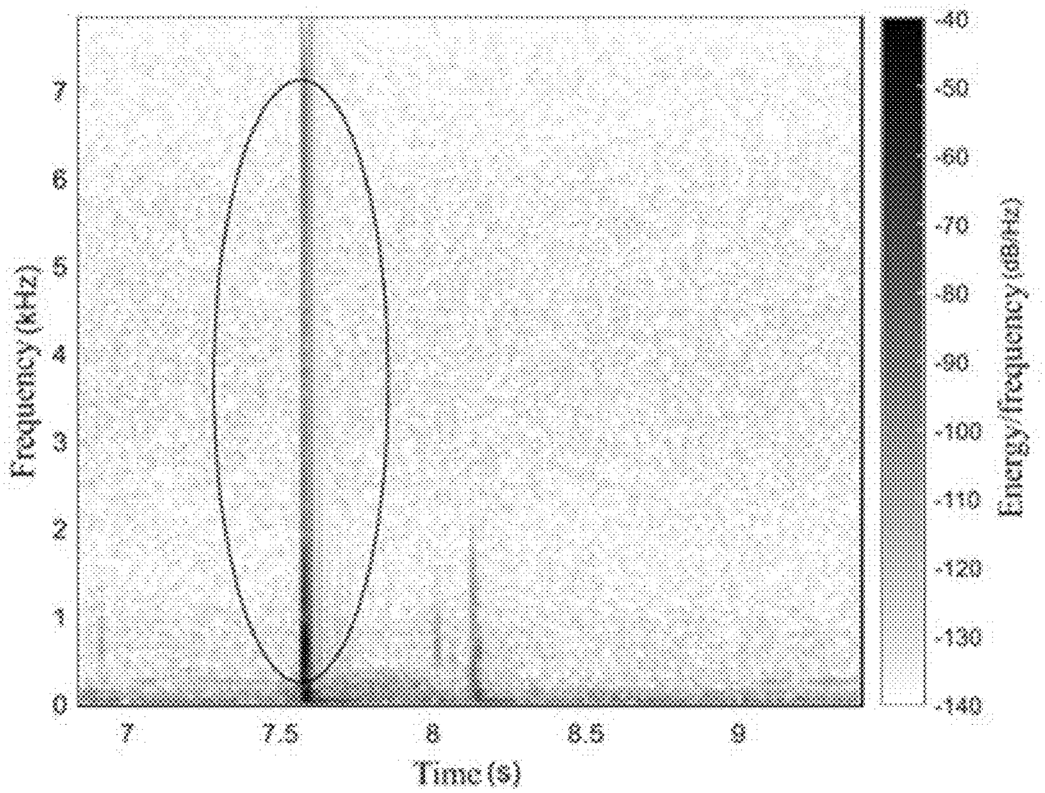
FIG. 7 exemplarily shows a frequency spectrum of a segment of in-ear microphone signal collected during teeth occlusion (collision).

This article studies some typical human activities, including mouth movements (mouth opening/closing) when not speaking, swallowing, chewing/teeth occlusion. Examples of data collected by the in-ear microphone in the three cases are shown in FIG. 5, FIG. 6, and FIG. 7 respectively, wherein the signal data is recorded in a quiet anechoic chamber. From FIG. 5, FIG. 6, and FIG. 7, some characteristics of the frequency spectrum of the data collected by the in-ear microphone in the three cases can be observed, respectively. FIG. 5 shows that the opening movement of the mouth can produce some weak noise below 2 kHz, but it will not seriously affect the processing of the speech signal, and therefore, no special processing is required. In the subsequent process of closing the mouth, there is some vibration from the lips, and some slight teeth occlusion sounds may occur, thus generating noise in the entire frequency band (see, for example, the part circled by the ellipse in the figure), but the energy of the noise is weaker than the energy of the teeth occlusion sound when chewing. Teeth occlusion sounds during chewing have strong peaks in the waveform, and the frequency spectrum spreads across the entire frequency band (see FIG. 7, especially the part circled by the ellipse). Referring to FIG. 6, there is no strong physical vibration in the swallowing activity, the energy below 500 Hz is weak, and the frequency spectrum above 500 Hz extends to near the Nyquist frequency.

Most existing correlation algorithms for peak removal can only inpaint very short peak waveforms, and noises caused by these human activities usually last for more than 100 sampling points (under the condition of a sampling rate of 16000 Hz). Some existing impulse noise removal methods aim to estimate models of noises, which are usually computationally intensive and the recovered waveforms are dominated by noises, while the recovered information of the speech signal is insufficient.

The inventors conducted further research on the signals captured by the in-ear microphone and the in-air microphone. Human speech can also be conducted through bones and tissues, as well as through the Eustachian tube. The Eustachian tube is a small passage that connects the throat to the middle ear. As mentioned above, the gain setting for the in-ear microphone is relatively low, and because the in-ear microphone is inserted into the ear and physically isolated from the environment, there is usually very little noise leaking into the in-ear microphone, and therefore, speech and external noise less likely cause clipping of the in-ear microphone signal.

A propagation path of a signal through the in-ear microphone is different from a propagation path thereof in the air, and therefore, the signal received by the in-ear microphone differs in the frequency spectrum. More specifically, a voiced sound signal received by the in-ear microphone shows strong intensity in a low frequency band (for example, below 200 Hz). However, in a frequency band of 200 Hz to 2500 Hz, the intensity of the signal gradually decreases, and this loss becomes significant as the frequency increases. This loss in the frequency spectrum can be compensated for by a transfer function, and the transfer function may be estimated in advance and updated for each individual during quiet or high signal-to-noise ratio (SNR) periods.

Based on the above discussion, there are two types of distortion problems that appear in signals captured by earphones. The present disclosure proposes a method of recovering distorted speech signals by using cross-channel signals. Specifically, the method includes detecting whether there is a distortion in an in-air signal and an in-ear signal respectively captured by an in-air microphone and an in-ear microphone for a speech signal of an earphone wearer received by an earphone, and performing corresponding recovering on the distorted signals. The in-ear signal from the in-ear microphone is used to recover the clipped in-air signal from the in-air microphone, and the in-air signal from the in-air microphone is used to recover the in-ear signal contaminated by noises caused by some human activities. The method disclosed in the present disclosure not only can solve the clipping problem, but also can successfully recover spectral information of the speech signal, while eliminating the sound (such as "pop" or "click") that makes a listener at a remote end of the communication (that is, an earphone wearer at a remote end) unpleasant. This greatly improves the quality and intelligibility of speech/speech data, allowing the listener to better recognize sounds, thereby improving the user experience.

Figure 8:
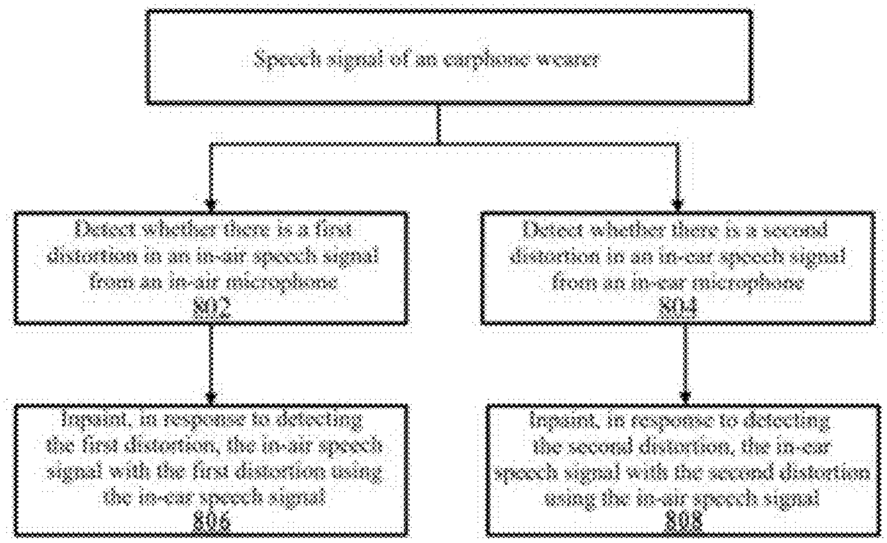
FIG. 8 schematically illustrates a flow chart of a method for detecting distortions of speech signals and inpainting the distorted speech signals accordingly according to one or a plurality of embodiments of the present disclosure.

FIG. 8 schematically illustrates a flow chart of a method for detecting distortions of speech signals and inpainting the distorted speech signals accordingly according to one or a plurality of embodiments of the present disclosure.

As shown in FIG. 8, the in-air microphone and the in-ear microphone in the earphone can receive the speech signal of the earphone wearer respectively through different channels. The method of the present disclosure, at S802, can detect whether there is a first distortion in the in-air signal from the in-air microphone, the first distortion being a distortion caused by the in-air signal from the in-air microphone being clipped. In some embodiments, whether there is a first distortion is determined by determining whether there is clipping in the in-air signal from the in-air microphone. Specifically, a two-stage clipping detection method can be used to detect whether there is clipping. In some embodiments, the clipping conditions may include two types of clipping conditions: threshold clipping and soft clipping.

At S804, it may be detected whether there is a second distortion in the in-ear signal from the in-ear microphone, the second distortion being a distortion caused by a non-speech pseudo signal existing in the in-ear signal from the in-ear microphone. In other words, the second distortion is caused by the non-speech pseudo signal (or referred to as special noise) caused by human non-speech activities (for example, human mouth/oral movements). In some embodiments, it is determined whether there is a second distortion based on determining whether there is a non-speech pseudo signal in the in-ear signal from the in-ear microphone. In some embodiments, it may be determined whether there is a second distortion based on a similarity between the in-ear signal and an estimated in-air signal and a signal feature extracted from the in-ear signal, such as through a human non-speech activity detector (which may also be referred to as a pseudo signal detector).

At S806, if the first distortion is detected, inpainting is performed on the in-air signal with the first distortion by using the in-ear signal. In some embodiments, the inpainting processing may include declipping and fusing.

At S808, if the second distortion is detected, inpainting is performed on the in-ear signal with the second distortion by using the in-air signal. In some embodiments, the inpainting processing may include peak removal and fusing.

Figure 9:
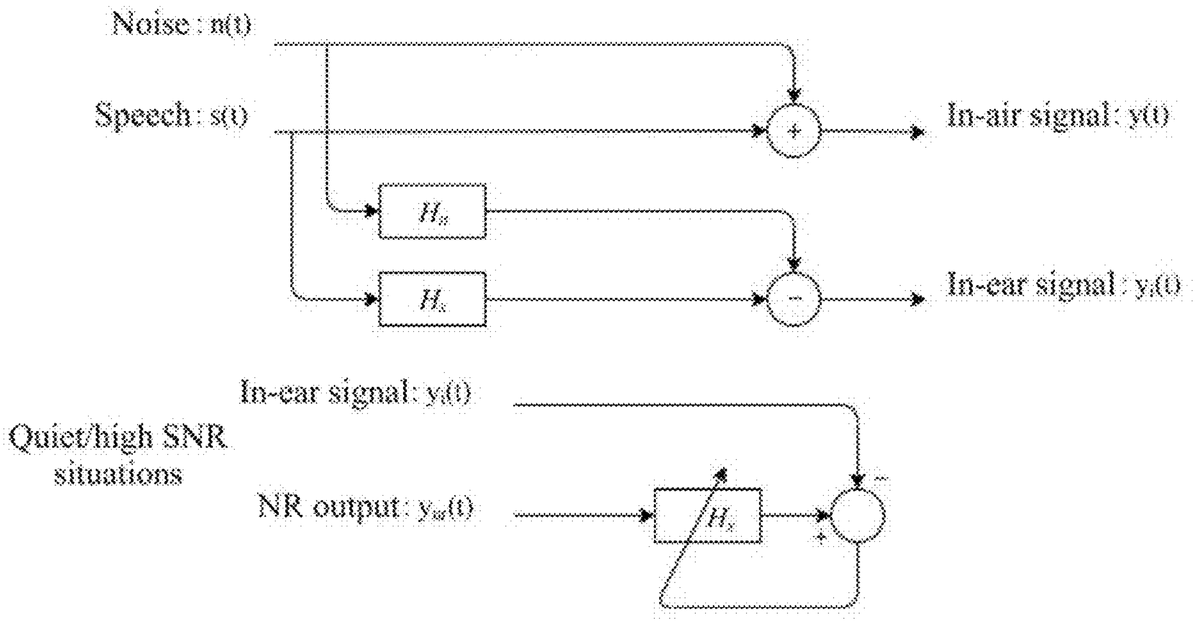
FIG. 9 exemplarily shows a schematic block diagram for estimating a transfer function between speech signals received by an in-air microphone and an in-ear microphone.

FIG. 9 exemplarily shows a schematic block diagram for estimating a transfer function between speech signals received by an in-air microphone and an in-ear microphone. Models of a noise signal n(t) and a speech signal s(t) propagated and received by an earphone device (including, for example, an in-air microphone and an in-ear microphone) are shown in the figure. A transfer function Hn describes an isolation effect of the earphone on noise, while the transfer function Hs represents a difference between two propagation paths of the speech signal of the earphone wearer. The outputs of the two propagation paths are the in-air speech signal (speech signal with noise) y(t) and the in-ear speech signal yi(t). The transfer function Hs can be estimated in advance in an adaptive filtering manner by traversing a large amount of data under quiet conditions or high SNR situations with effective noise suppression. In the following, the transfer function Hs may also be expressed as Hs(s). The process of adaptively estimating the transfer function is also described in FIG. 9. The NR output ynr(t) represents an output of the in-air speech y(t) after noise reduction processing.

In some embodiments, the transfer function Hs(s) can be pre-estimated. The pre-estimated transfer function Hs(s) is a corresponding mathematical relationship in the frequency domain with a speech signal of the wearer collected by the in-air microphone as an input and a speech signal of the wearer collected by the in-ear microphone as an output. Those skilled in the art can understand that based on similar principles, another transfer function G(s) can be pre-estimated. The pre-estimated transfer function G(s) is a corresponding mathematical relationship in the frequency domain with a speech signal of the wearer collected by the in-ear microphone as an input and a speech signal of the wearer collected by the in-air microphone as an output. Correspondingly, impulse responses Hs(s) and G(s) of the corresponding system of the pre-estimated transfer functions h(t) and g(t) in the time domain may be obtained respectively.

From this, the estimated in-ear microphone signal $\hat{y}_i(t)$ can be calculated based on the in-air microphone signal, and its calculation method is given by the following formula $$\hat{y}_i(t) = y(t) * h(t), \tag{2}$$

wherein y(t) is the in-air speech signal output by the in-air microphone, h(t) is the impulse response of the transfer function Hs(s) in the time domain.

Additionally, the estimated speech signal $\hat{s}(t)$ can be calculated using the in-ear microphone signal, and its calculation method is given by the following formula $$\hat{s}(t) = y_i(t) * g(t), \tag{3}$$

wherein $y_i(t)$ is the in-ear speech signal output by the in-ear microphone, and g(t) is the impulse response of the transfer function G(s) in the time domain.

According to one or a plurality of embodiments, the present disclosure proposes a two-stage clipping detection method that includes constant threshold clipping detection using amplitude histograms and soft clipping detection using inter-channel similarities and more features. In some embodiments, detecting whether there is a distortion caused by clipping (first distortion) in the in-air signal from the in-air microphone may include detecting whether there is threshold clipping in the in-air signal and detecting whether there is soft clipping in the in-air signal. The threshold clipping may include single clipping and double clipping. In some embodiments, detecting whether there is threshold clipping in the in-air signal includes: inputting the in-air signal to an adaptive histogram clipping detector; and determining, if it is detected that output statistical data of the adaptive histogram clipping detector has high edge values on both sides or one side, that there is threshold clipping in the in-air signal. Those skilled in the art can understand that the histogram clipping detector can be implemented by relevant software, hardware, or a combination of the two. Existing histogram clipping detectors implemented in any manner are all applicable to the method of the present disclosure. A histogram of an audio signal needs to be calculated in the operation of the histogram clipping detector, and at the same time, the detection operation of this detector is related to the number of histogram bins, because the number of bins determines the resolution. The number of bins in turn depends on the length of analysis data, such as the frame size. For example, for a frame having a length of 1024, the number of histogram bins may be set to 100. Therefore, the "adaptive histogram clipping detector" means that the number of bins of the histogram clipping detector can be set adaptively with the length of the data. The above two-stage clipping detection method will be further explained below with reference to FIG. 2, FIG. 10, and FIG. 11.

Figure 10:
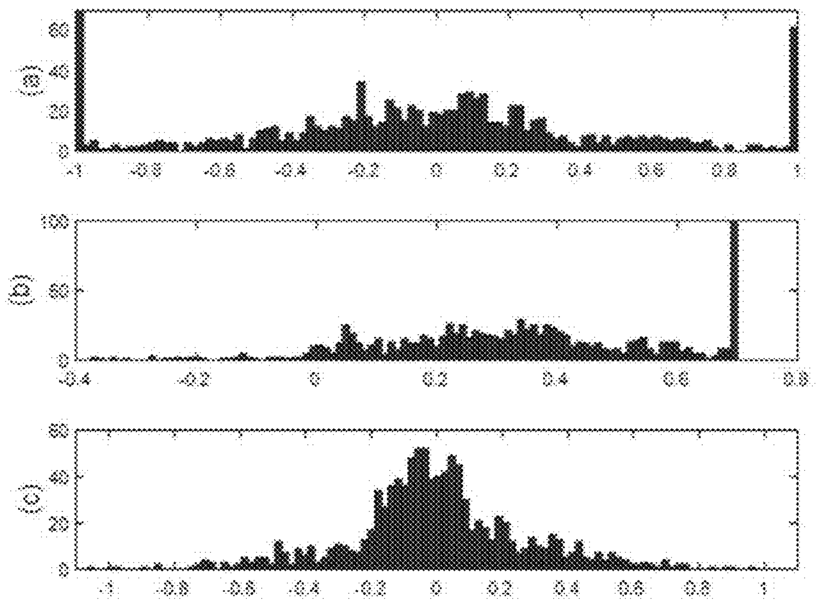
FIG. 10 exemplarily shows an amplitude histogram corresponding to three signals (with different clipping phenomena) in FIG. 2.

Regarding the three types of clipping discussed above with reference to FIG. 2 (that is, double clipping, single clipping, and soft clipping), for clipping corresponding to the first and second types (that is, double clipping and single clipping), these clipping conditions can be easily identified when the signal amplitude exceeds a threshold and is recorded as a constant. It is worth noting that the setting of the threshold $\theta_T$ is not fixed and may be different in different situations and systems. For statistics on a long enough audio signal, signal values should meet an approximately uniform or Gaussian distribution without clipping. However, if clipping occurs, it will produce high statistical values at an edge (a threshold) of the histogram. For example, the amplitude histogram corresponding to the signal in FIG. 2 (with different clipping phenomena) is shown in FIG. 10. In FIG. 10, the abscissa represents the amplitude of the signal, and the ordinate represents the number of occurrences of the corresponding amplitude. Accordingly, the first and second types of clipping conditions (as shown in histograms (a) and (b)) may be easily identified as the presence of significantly high edge values on both sides or one side in the histogram. However, the soft clipping condition (for example, as shown in histogram (c)), cannot be detected. However, the soft clipping is usually a result of reprocessing a signal, after the signal is clipped at double sides or a single side and recorded as a constant threshold, by another module (for example, a DC blocker), and therefore, for example, these features below may be used to detect this situation:

1) Have low correlation with an estimated signal $\hat{s}(t)$ (see the formula (3)) obtained by estimation using the in-ear signal and transfer function;
2) Higher amplitude around an original clipped constant value;
3) High spectral flatness values caused by clipping distortion;
4) The energy distribution is different from that of unvoiced speech signals, although unvoiced speech signals also often have higher flatness.

Figure 11:
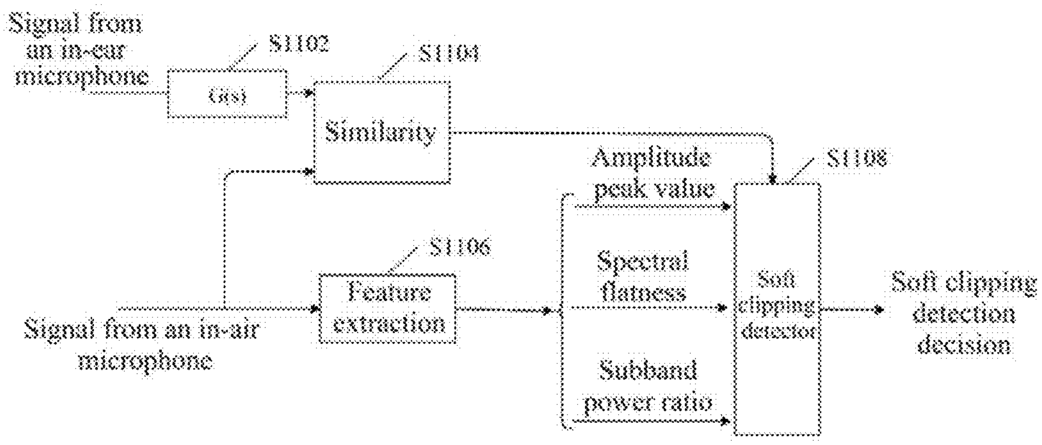
FIG. 11 exemplarily shows a schematic diagram of a method for detecting whether there is soft clipping in an in-air signal from an in-air microphone according to one or a plurality of embodiments of the present disclosure.

FIG. 11 exemplarily shows a schematic diagram of a method for detecting whether there is soft clipping in an in-air signal from an in-air microphone according to one or a plurality of embodiments of the present disclosure. As shown in FIG. 11, in S1102, an estimated signal is obtained using an in-ear signal from an in-ear microphone and a pre-estimated transfer function G(s). In some examples, the in-ear signal may be converted from a time domain signal into a frequency domain signal by using an algorithm such as Fourier transform and fast Fourier transform. Then, the estimated signal is obtained based on the in-ear signal in the frequency domain and the pre-estimated transfer function G(s). In S1104, a similarity between the in-air signal from the in-air microphone and the estimated signal calculated by S1102 may be determined (that is, a correlation calculation may be performed). Those skilled in the art can understand that any existing method for correlation calculation in the field of signal processing may be applicable to the present disclosure. In S1106, signal features may be extracted from the in-air signal from the in-air microphone. In some examples, the signal features may include at least one of amplitude peak value, spectral flatness, and subband power ratio. In S1108, a soft clipping detector determines whether there is soft clipping in the in-air signal based on the similarity determined in S1104 and the signal features extracted in S1106. Those skilled in the art can understand that the soft clipping detector may be implemented by relevant software or hardware, such as the above processing performed by another module (such as the DC blocker). Existing soft clipping detectors implemented in any methods are all applicable to the method of the present disclosure.

Regarding the detection of relevant human activities using the in-ear microphone, the above pseudo signals caused by special human non-speech activities (that is, non-speech pseudo signals) may be identified, for example, by using the following features:

1) The signals collected by the in-ear microphones are significantly different from the signals collected by the in-air microphone, these activities produce vibrations but no noticeable sound, and therefore, the two microphones are affected differently.
2) The signals caused by these human activities captured by the in-ear microphone have some special features, and these features are not usually present in human speech. Specifically:
   a. They appear as impulsive and sharp signals in the time domain.
   b. They have very high spectral flatness across the frequency band. Specifically: for mouth movements, high-intensity signals may continue from low frequencies to 2000 Hz or even higher; for swallowing, high-intensity signals cover almost the entire frequency band, but low-frequency (below 500 Hz) signal intensity is weak; for teeth bumping/occlusion, the signal covers the entire frequency band with a strong low frequency part.
   c. Their power intensity decreases smoothly with increasing frequency, unlike unvoiced sounds.
   d. They do not have a harmonic structure, unlike voiced speech; if some mouth movements occur while speaking, this will partially mask the existing harmonic structure in the frequency spectrum of a voiced speech signal.

Therefore, it is further proposed herein a detection method for noise caused by human non-speech activities, which takes advantage of the similarity between channels and the plurality of features of the in-ear microphone signal.

Figure 12:
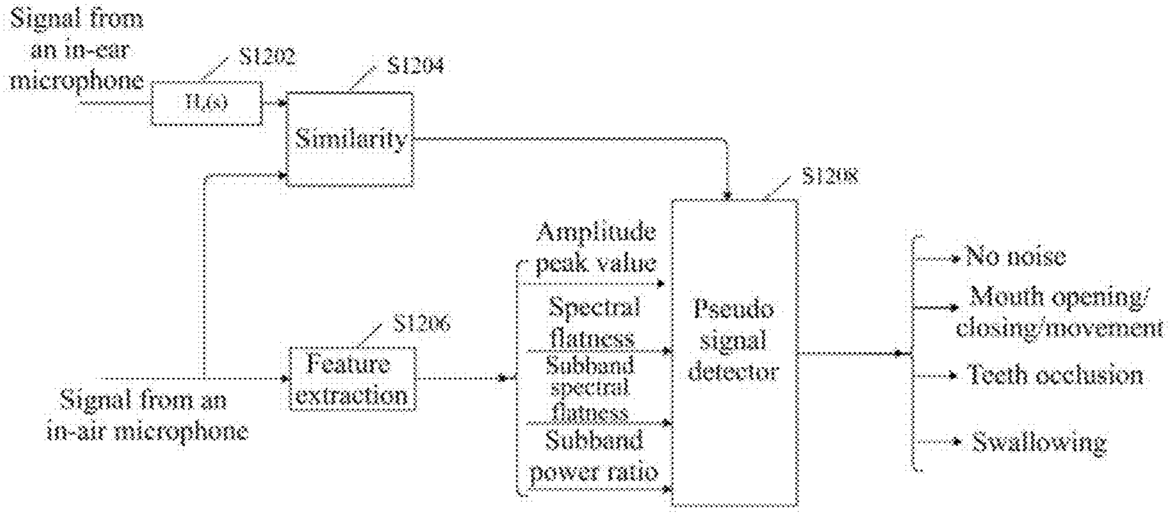
FIG. 12 exemplarily shows a schematic diagram of a method for detecting whether there is a pseudo signal (special noise) caused by a human non-speech activity in an in-ear signal from an in-ear microphone according to one or a plurality of embodiments of the present disclosure.

FIG. 12 exemplarily shows a schematic diagram of a method for detecting whether there is a non-speech pseudo signal (which causes a second distortion) caused by a human activity in an in-ear signal from an in-ear microphone according to one or a plurality of embodiments of the present disclosure. As shown in FIG. 12, in S1202, an estimated signal is obtained using an in-air signal from an in-air microphone and a pre-estimated transfer function Hs(s). In some examples, the in-air signal may be converted from a time domain signal into a frequency domain signal by using an algorithm such as Fourier transform and fast Fourier transform. Then, the estimated signal is obtained based on the in-air signal in the frequency domain and the pre-estimated transfer function Hs(s). In S1204, a similarity between the in-ear signal from the in-ear microphone and the estimated signal calculated by S1202 may be determined (that is, a correlation calculation may be performed). Those skilled in the art can understand that any existing method for correlation calculation in the field of signal processing may be applicable to the present disclosure. In S1206, signal features may be extracted from the in-ear signal from the in-ear microphone. In some examples, the signal features may include at least one of amplitude peak value, spectral flatness, subband spectral flatness, and subband power ratio. In S1208, by using a pseudo signal detector (or referred to as a special noise detector), it is determined, based on the similarity determined through S1204 and the signal features extracted through S1206, for example, through the pseudo signal detector, whether there is a second distortion caused by human non-verbal activities, that is, it is determined whether there is non-speech pseudo signals (or referred to as special noise) caused by human non-verbal activities in the in-ear signal. In some examples, the human non-verbal activities corresponding to the non-speech pseudo signals, such as mouth opening/closing/movement, teeth occlusion, and swallowing, may also be determined through the pseudo signal detector. Those skilled in the art can understand that the pseudo signal detector may be a classifier, for example, Bayesian statistical analysis or even simple threshold analysis may be used, and specific classification of activities can thus be identified based on features.

Figure 13:
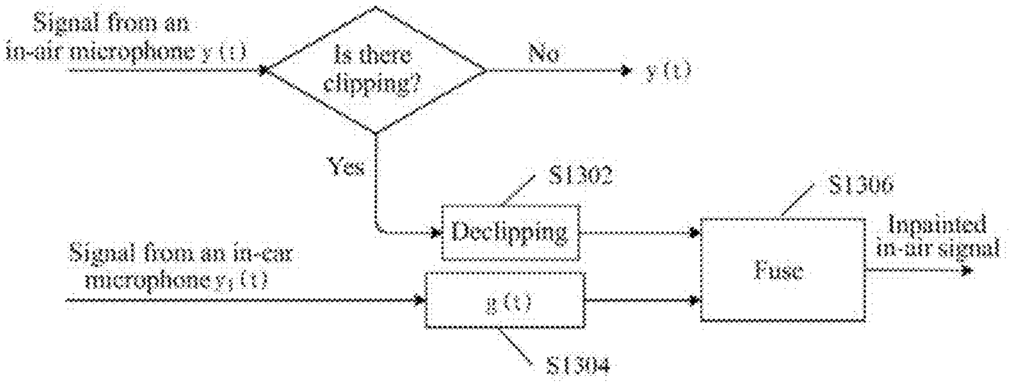
FIG. 13 exemplarily shows a schematic diagram of a method for recovering a clipped signal from an in-air microphone according to one or a plurality of embodiments of the present disclosure.

FIG. 13 exemplarily shows a schematic diagram of a method for recovering a clipped signal from an in-air microphone according to one or a plurality of embodiments of the present disclosure. As shown in FIG. 13, if it is detected that there is a distortion caused by clipping in the in-air signal from the in-air microphone, at S1302, declipping processing is performed on the in-air signal to generate a declipped signal. In some examples, a clipped portion of the in-air signal (that is, the clipped/distorted signal) from the in-air microphone is first estimated by a declipping processing method such as the least square method or simple cubic interpolation to derive the estimated in-air microphone signal $\tilde{y}(t)$ (that is, generate a declipping signal $\tilde{y}(t)$).

At S1304, a pre-estimated signal is generated based on the in-ear signal from the in-ear microphone and an estimated impulse response. In some examples, the estimated signal $\hat{s}(t)$ is generated based on the in-ear signal $y_i(t)$ from the in-ear microphone and the impulse response g(t), see the formula (3) above.

Then, at S1306, the declipped signal at S1302 is fused with the estimated signal generated at S1304 to generate an inpainted in-air signal. In some examples, the estimated in-air microphone signal $\tilde{y}$ (t) is fused with a speech signal $\hat{s}(t)$ estimated by using the in-ear microphone signal to reconstruct the in-air microphone signal $\hat{x}(t)$. There may be many fusion methods available here. For example, a simple cross fading fusion method may be used. The reconstructed in-air microphone signal (that is, the inpainted in-air signal) may be given by the following formula:

$$\hat{x}(t) = f_1(\tilde{y}(t), \hat{s}(t)) \tag{4}$$

Figure 14:
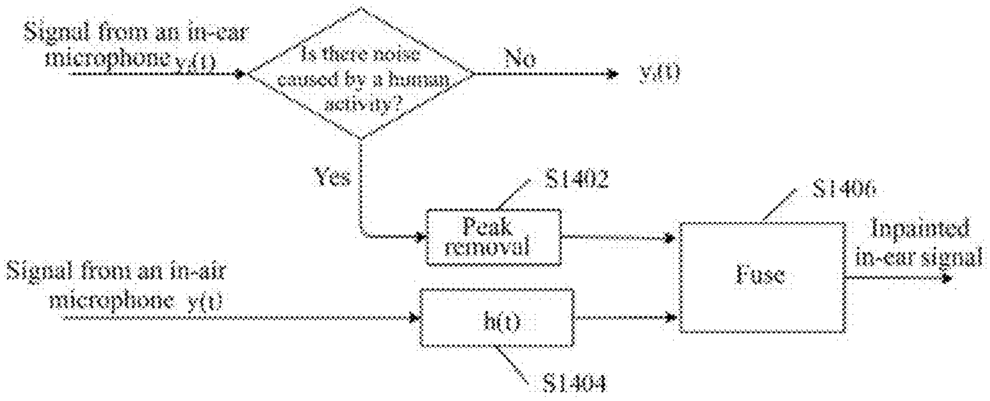
FIG. 14 exemplarily shows a schematic diagram of a method for recovering an in-ear signal having special noise caused by a human activity from an in-ear microphone according to one or a plurality of embodiments of the present disclosure.

FIG. 14 exemplarily shows a schematic diagram of a method for recovering an in-ear signal from an in-ear microphone according to one or a plurality of embodiments of the present disclosure, wherein the in-ear signal includes a non-speech pseudo signal (that is, a special noise signal) caused by a human activity. As shown in FIG. 14, if it is detected that there is a distortion caused by a human activity in the in-ear signal from the in-ear microphone, a peak removal process is performed on the in-ear signal at S1402 to generate a peak-removed signal. In some examples, the in-ear microphone signal $y_i(t)$ captured by the in-ear microphone and contaminated by a human non-verbal activity is estimated by spiking removal methods (such as the Savitzky-Golay filter or simple cubic interpolation) to generate a peak-removed signal $\tilde{y}_i(t)$.

At S1404, an estimated signal is generated based on the in-air signal from the in-air microphone and a pre-estimated impulse response. In some examples, the estimated signal $\hat{y}_i(t)$ is generated based on the in-air signal y(t) from the in-air microphone and the pre-estimated impulse response h(t), see the formula (2).

Then, at S1406, the peak-removed signal at S1402 is fused with the estimated signal generated at S1404 to generate an inpainted in-ear signal. In some examples, the estimated in-ear microphone signal $\tilde{y}_i(t)$ is fused with a speech signal $\hat{y}_i(t)$ estimated by using the in-air microphone signal y(t) (for example, using a simple cross fading fusion method) to reconstruct an in-ear microphone signal, and the reconstructed in-ear microphone signal $\hat{x}_i(t)$ is given by the following formula:

$$\hat{x}_i(t) = f_2(\tilde{y}_i(t), \hat{y}_i(t)) \tag{4}$$

Compared with existing methods that mainly use signals from the same channel to recover contaminated signals, the method proposed in the present disclosure using cross-channel signals to perform distortion detection and inpaint distorted signals can better detect and identify distortions in different aspects, and can use cross-channel signals to inpaint the distortions in different aspects at the same time. In this way, the method proposed in the present disclosure not only can solve the clipping problem, but also can successfully recovers the spectral information of the speech signal, while eliminating sounds (such as “pop” or “click” sounds) that are unpleasant to the listener at the far end of the communication (that is, the earphone wearer). Therefore, the method of using cross-channel signals for distortion detection and distortion inpainting proposed by the present disclosure can greatly improve the quality and intelligibility of speech data when using an earphone, allowing a listener to better recognize sounds, thereby improving the user experience of the earphone wearer.

Figure 15:
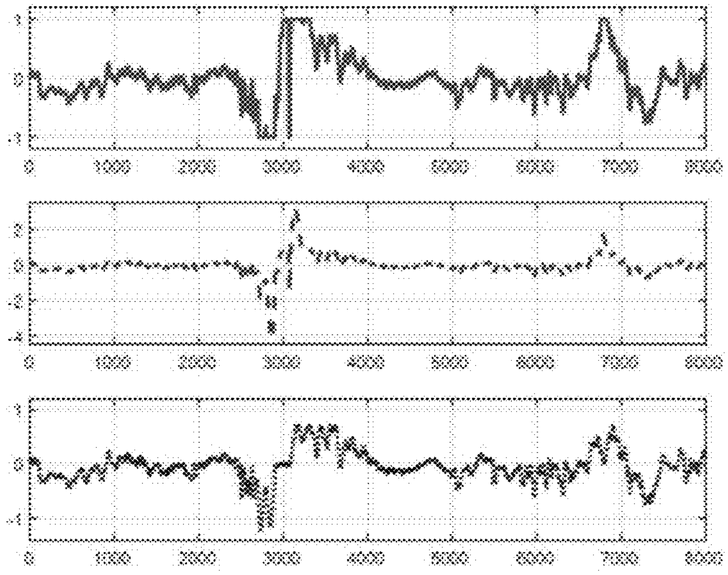
FIG. 15 exemplarily shows a simulation diagram of a clipped signal from an in-air microphone, a signal recovered by an existing declipping method, and a signal recovered using the method of the present disclosure.

In FIG. 15, a simulation diagram of a clipped signal from an in-air microphone, a simulation diagram of a signal $\hat{y}(t)$ obtained by recovering the signal from the in-air microphone using an existing conventional declipping method (for example, a method of recovering unknown samples by using information of adjacent samples in the same channel), and a simulation diagram of a signal $\hat{x}_i(t)$ obtained by inpainting the signal from the in-air microphone using the method of the present disclosure are shown respectively from top to bottom.

Figure 16:
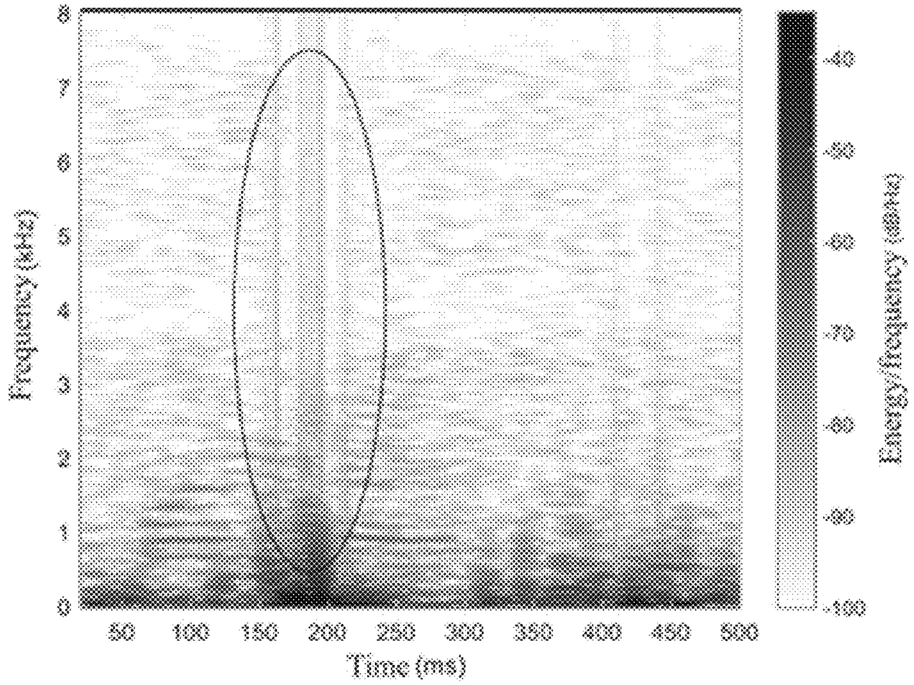
FIG. 16 exemplarily shows a frequency spectrum of a recovered signal obtained by performing recovering processing using an existing known declipping method for the clipped signal corresponding to the frequency spectrum map in FIG. 4.
Figure 17:
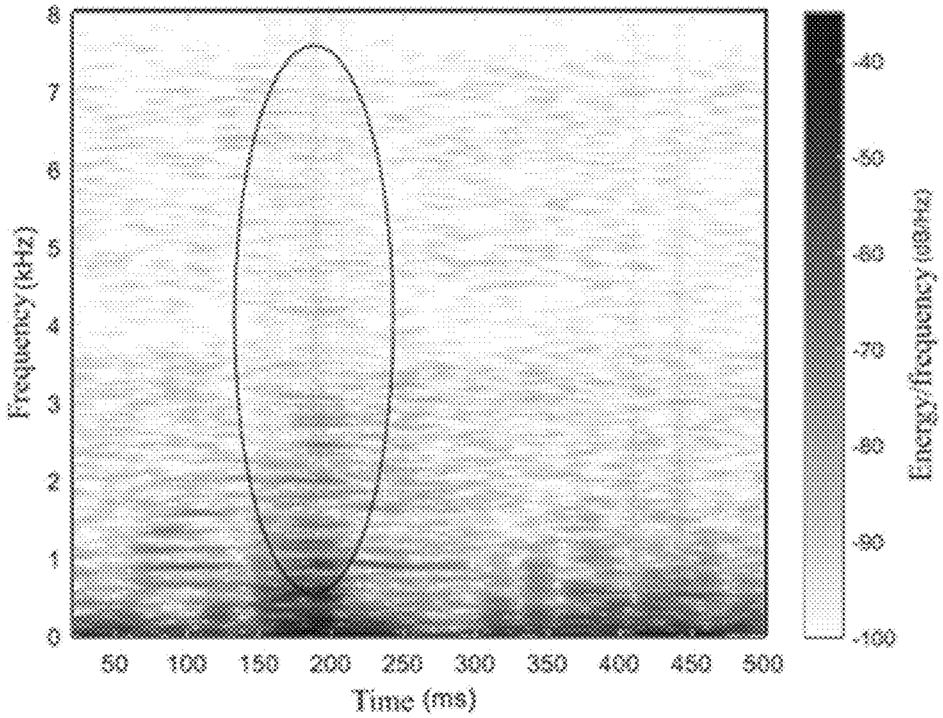
FIG. 17 exemplarily shows a frequency spectrum of an inpainted signal obtained by performing inpainting processing using the method proposed in the present disclosure for the clipped signal corresponding to the frequency spectrum map in FIG. 4.

FIG. 16 and FIG. 17 are respectively corresponding signal frequency spectrum maps obtained after recovering the contaminated signal corresponding to the frequency spectrum map in FIG. 4. FIG. 16 is a frequency spectrum map of a recovered signal obtained by recovering the contaminated signal using the existing same-channel signal (in other words, only using the declipping processing). FIG. 17 is a frequency spectrum map of a recovered signal obtained by recovering the contaminated signal using the cross-channel signal as described above in the present disclosure.

As can be seen from the comparison between FIG. 16 and FIG. 17, using the method proposed in the present disclosure can recover more frequency spectrum information of the speech signal (see the part circled by the ellipse in FIG. 17, in which transverse harmonic information is richer) while effectively removing the clipping distortion, which is very helpful for improving the quality and intelligibility of the recovered speech signal.

Figure 18:
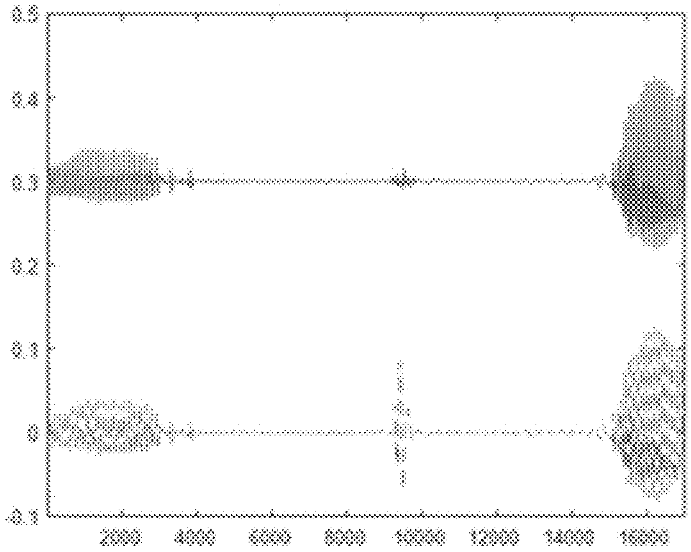
FIG. 18 exemplarily shows a signal diagram, wherein an upper part of the figure shows a segment of an in-ear signal that is distorted by a human non-verbal activity (such as mouth closing), and a lower part of the figure shows an inpainted signal obtained by inpainting the segment of in-ear signal using the method proposed by the present disclosure.
Figure 19:
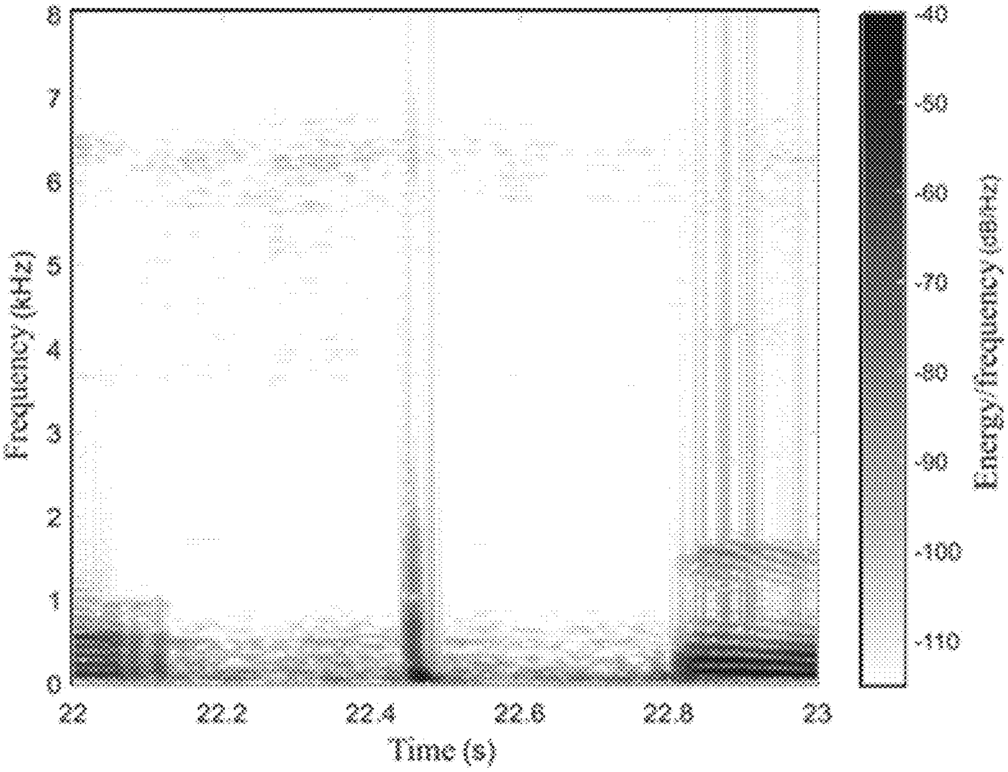
FIG. 19 exemplarily shows a frequency spectrum of the in-ear signal shown in the upper part of FIG. 18.
Figure 20:
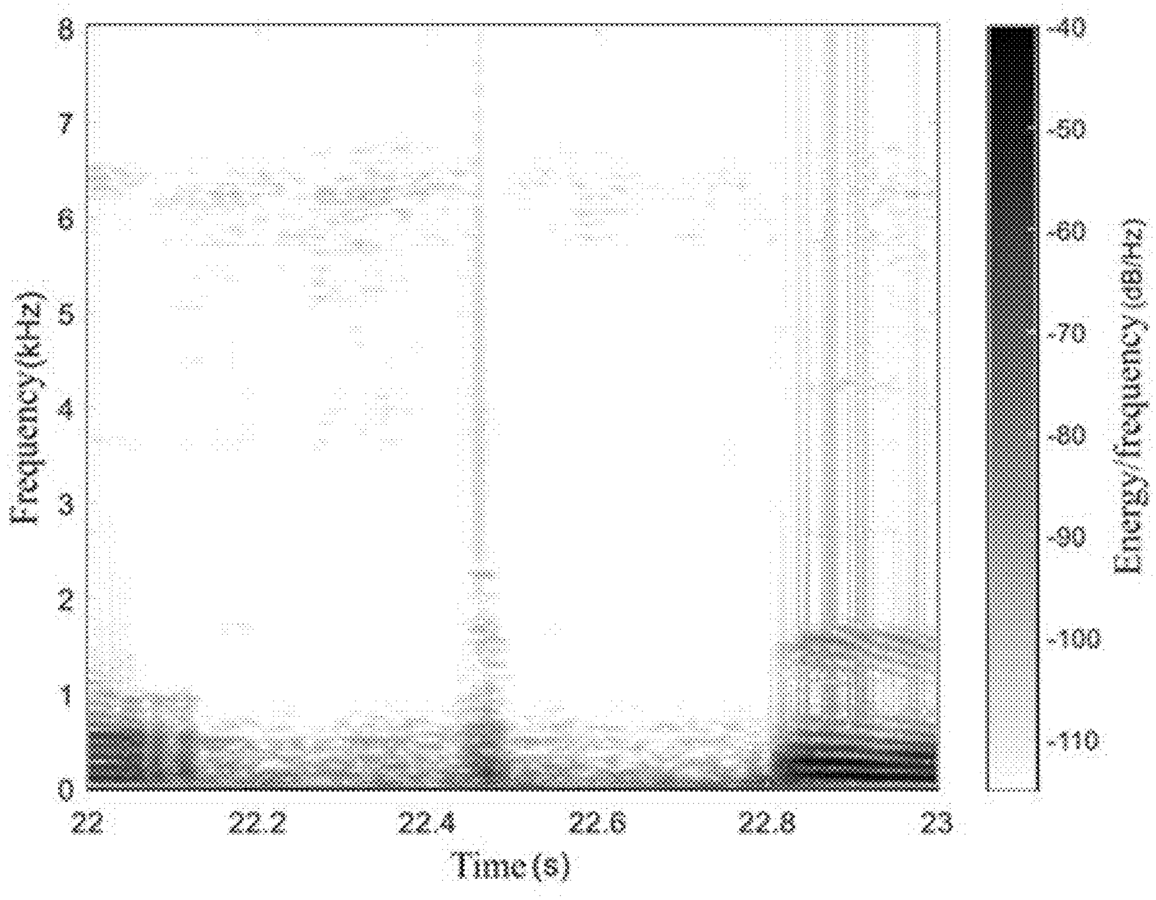
FIG. 20 exemplarily shows a frequency spectrum of the inpainted signal shown in the lower part of FIG. 18.

FIG. 18 shows a segment of an in-ear signal (the upper portion of the figure) that includes a distortion (that is, includes specific noise) caused by a non-verbal human activity (such as mouth closure), and a signal (the lower portion of the figure) obtained by inpainting the segment of the in-ear signal using the method proposed in the present disclosure. Their corresponding spectral diagrams are shown in FIG. 19 and FIG. 20 respectively. In order to make the contrast effect clearer, in FIG. 18, the removed signal is moved upward by 0.3. As can be clearly seen from the above figure, the method proposed in the present disclosure can effectively remove the special noise caused by human mouth activities and well recover the in-ear signal, and the "boom" sound is eliminated. This is presented in FIG. 18 as a peak appearing in the middle of a time axis of the original signal is removed, and is shown in FIG. 20 as energy at a corresponding time period is reduced.

According to another aspect of the present invention, a system for detecting distortions of speech signals and inpainting the distorted speech signals is further provided. The system includes a memory and a processor. The memory stores computer-readable instructions. The computer-readable instructions, when executed, cause the processor to be capable of performing the method described herein above.

Based on the foregoing, a method and a system of recovering a contaminated speech signal by using a cross-channel signal is proposed in the present disclosure. Specifically, the method may include detecting a distortion and recovering, using an in-ear microphone signal, a clipped in-air signal from an in-air microphone, and recovering, using an in-air microphone signal, an in-ear signal contaminated by noise caused by some human activities. A two-stage clipping detection method is adopted, which includes constant threshold clipping detection using amplitude histograms and soft clipping detection using inter-channel similarities and more features. Further, detection of noise caused by human non-verbal activities is also performed, which utilizes the similarity between channels and more signal features. In addition, the method proposed herein utilizes the transfer function between the in-air microphone and the in-ear microphone to estimate the difference between the two propagation paths, and proposes a method of identifying human activities that generate noise for the in-ear microphone. The method proposed in this article greatly improves the quality and understandability of speech data during earphone use, so that the earphone wearer can better recognize sounds, thereby improving the user experience of the earphone wearer.

Clause 1. In some embodiments, a method for detecting distortions of speech signals and inpainting the distorted speech signals includes: detecting whether there is a first distortion caused by clipping in an in-air speech signal from an in-air microphone; detecting whether there is a second distortion caused by a non-speech pseudo signal in an in-ear speech signal from an in-ear microphone; inpainting, in response to detecting the first distortion, the in-air speech signal with the first distortion using the in-ear speech signal; and inpainting, in response to detecting the second distortion, the in-ear speech signal with the second distortion using the in-air speech signal.

Clause 2. The method according to any preceding clause, wherein the detecting whether there is a first distortion caused by clipping in an in-air speech signal from an in-air microphone includes: detecting whether there is threshold clipping in the in-air speech signal, wherein the threshold clipping includes at least one of single clipping or double clipping; and detecting whether there is soft clipping in the in-air speech signal.

Clause 3. The method according to any preceding clause, wherein the detecting whether there is threshold clipping in the in-air speech signal includes: inputting the in-air speech signal to an adaptive histogram clipping detector; and determining, in response to detecting that output statistical data of the adaptive histogram clipping detector has high edge values on both sides or one side, that there is threshold clipping in the in-air speech signal.

Clause 4. The method according to any preceding clause, wherein the detecting whether there is soft clipping in the in-air speech signal includes: determining a first similarity between the in-air speech signal and a first estimated signal, wherein the first estimated signal is obtained based on the in-ear speech signal and a first pre-estimated transfer function; extracting a first signal feature from the in-air speech signal; and determining, based on the first similarity and the first signal feature, whether there is soft clipping in the in-air speech signal.

Clause 5. The method according to any preceding clause, wherein the detecting whether there is a second distortion caused by a non-speech pseudo signal in an in-ear speech signal from an in-ear microphone includes: determining a second similarity between the in-ear speech signal and a second estimated signal, wherein the second estimated signal is obtained based on the in-air speech signal and a second pre-estimated transfer function; extracting a second signal feature from the in-ear speech signal; and determining, based on the second similarity and the second signal feature, whether there is a second distortion caused by the non-speech pseudo signal in the in-ear speech signal.

Clause 6. The method according to any preceding clause, wherein the inpainting, in response to detecting the first distortion, the in-air speech signal with the first distortion using the in-ear speech signal includes: performing, in response to detecting the first distortion, a declipping process on the in-air speech signal to generate a declipped signal; generating a third estimated signal based on the in-ear speech signal and a first pre-estimated impulse response; and fusing the declipped signal and the third estimated signal to generate an inpainted in-air speech signal.

Clause 7. The method according to any preceding clause, wherein the inpainting, in response to detecting the second distortion, the in-ear speech signal with the second distortion using the in-air speech signal includes: performing, in response to detecting the second distortion, a peak removal processing on the in-ear speech signal to generate a peak-removed signal; generating a fourth estimated signal based on the in-air speech signal and a second pre-estimated impulse response; and fusing the peak-removed signal and the fourth estimated signal to generate an inpainted in-ear speech signal.

Clause 8. The method according to any preceding clause, wherein the first pre-estimated transfer function is a corresponding mathematical relationship in a frequency domain with a speech signal of a wearer collected by the in-ear microphone as an input and a speech signal of the wearer collected by the in-air microphone as an output.

Clause 9. The method according to any preceding clause, wherein the second pre-estimated transfer function is a corresponding mathematical relationship in the frequency domain with a speech signal of the wearer collected by the in-air microphone as an input and a speech signal of the wearer collected by the in-ear microphone as an output.

Clause 10. The method according to any preceding clause, wherein the first pre-estimated impulse response is an impulse response of a corresponding system of the first pre-estimated transfer function in a time domain, wherein the first pre-estimated transfer function is the corresponding mathematical relationship in the frequency domain with a speech signal of the wearer collected by the in-ear microphone as an input and a speech signal of the wearer collected by the in-air microphone as an output.

Clause 11. The method according to any preceding clause, wherein the second pre-estimated impulse response is an impulse response of a corresponding system of the second pre-estimated transfer function in the time domain, wherein the second pre-estimated transfer function is the corresponding mathematical relationship in the frequency domain with a speech signal of the wearer collected by the in-air microphone as an input and a speech signal of the wearer collected by the in-ear microphone as an output.

Clause 12. The method according to any preceding clause, wherein the first signal feature includes at least one of amplitude peak, spectral flatness, or subband power ratio.

Clause 13. The method according to any preceding clause, wherein the second signal feature includes at least one of amplitude peak, spectral flatness, subband spectral flatness, or subband power ratio.

Clause 14. In some embodiments, a system includes a memory and a processor, wherein the memory stores computer-readable instructions, and the computer-readable instructions, when executed by the processor, implement the method according to any one of claims 1 to 13.

Any one or more of the processor, memory, or system described herein includes computer-executable instructions, and the computer-executable instructions can be compiled or interpreted from computer programs created using various programming languages and/or technologies. Generally speaking, a processor (such as a microprocessor) receives and executes instructions, for example, from a memory, a computer-readable medium, and the like. The processor includes a non-transitory computer-readable storage medium capable of executing instructions of a software program. The computer-readable medium may be, but is not limited to, an electronic storage device, a magnetic storage device, an optical storage device, an electromagnetic storage device, a semiconductor storage device, or any suitable combination thereof.

The description of the embodiments has been presented for the purposes of illustration and description. Appropriate modifications and changes of the embodiments can be implemented in view of the above description or can be obtained through practical methods. For example, unless otherwise indicated, one or more of the methods described may be performed by a combination of suitable devices and/or systems. The method may be performed in the following manner: using one or more logic devices (for example, processors) in combination with one or more additional hardware elements (such as storage devices, memories, circuits, and hardware network interfaces) to execute the stored instructions. The method and associated actions may also be performed in parallel and/or simultaneously in various orders other than the order described in the present disclosure. The system is illustrative in nature, and may include additional elements and/or omit elements. The subject matter of the present disclosure includes all novel and non-obvious combinations of the disclosed various methods and system configurations and other features, functions, and/or properties.

The description of the embodiments has been presented for the purposes of illustration and description. Appropriate modifications and changes of the embodiments may be performed in view of the above description or the appropriate modifications and changes may be acquired through practical methods. The method and associated actions may also be performed in parallel and/or simultaneously in various orders other than the order described in the present application. The described system is illustrative in nature, and may include additional elements and/or omit elements. The subject matter of the present disclosure includes all novel and non-obvious combinations of the disclosed various systems and configurations and other features, functions, and/or properties.

As used in the present application, an element or step listed in the singular form and preceded by the word "a (n)/one" should be understood as not excluding a plurality of the elements or steps, unless such exclusion is indicated. Furthermore, references to "an embodiment" or "an example" of the present disclosure are not intended to be interpreted as excluding the existence of additional embodiments that also incorporate the recited features. The present invention has been described above with reference to specific embodiments. However, those of ordinary skill in the art will appreciate that various modifications and changes can be made without departing from the broader spirit and scope of the present invention as set forth in the appended claims.

What is claimed is:

1. A method for detecting distortion of speech signals and inpainting the distorted speech signals, comprising:
- detecting whether there is a first distortion caused by clipping in an in-air speech signal from an in-air microphone;
- detecting whether there is a second distortion caused by a non-speech pseudo signal in an in-ear speech signal from an in-ear microphone, wherein the non-speech pseudo signal is associated with at least one of mouth movement, teeth movement, or swallowing;
- inpainting the in-air speech signal with the first distortion using the in-ear speech signal in response to detecting the first distortion; and
- inpainting the in-ear speech signal with the second distortion using the in-air speech signal in response to detecting the second distortion.

2. The method of claim 1, wherein detecting whether there is the first distortion caused by clipping in the in-air speech signal from the in-air microphone comprises:
- detecting whether threshold clipping exists in the in-air speech signal, wherein the threshold clipping comprises at least one of single clipping or double clipping; and
- detecting whether soft clipping exists in the in-air speech signal.

3. The method of claim 2, wherein detecting whether the threshold clipping exists in the in-air speech signal comprises:
- inputting the in-air speech signal to an adaptive histogram clipping detector; and
- in response to detecting that output statistical data of the adaptive histogram clipping detector has high edge values on both sides or one side, determining that the threshold clipping exists in the in-air speech signal.

4. The method of claim 2, wherein detecting whether the soft clipping exists in the in-air speech signal comprises:
determining a first similarity between the in-air speech signal and a first estimated signal, wherein the first estimated signal is obtained based on the in-ear speech signal and a first pre-estimated transfer function;
extracting a first signal feature from the in-air speech signal; and
determining whether the soft clipping exists in the in-air speech signal based on the first similarity and the first signal feature.

5. The method of claim 1, wherein detecting whether there is the second distortion caused by the non-speech pseudo signal in the in-ear speech signal from the in-ear microphone comprises:
determining a second similarity between the in-ear speech signal and a second estimated signal, wherein the second estimated signal is obtained based on the in-air speech signal and a second pre-estimated transfer function;
extracting a second signal feature from the in-ear speech signal; and
determining whether there is the second distortion caused by a non-speech artifact in the in-ear speech signal based on the second similarity and the second signal feature.

6. The method of claim 1, wherein inpainting the in-air speech signal with the first distortion by using the in-ear speech signal in response to detecting the first distortion comprises:
performing a declipping process on the in-air speech signal to generate a declipped signal in response to detecting the first distortion;
generating a third estimated signal based on the in-ear speech signal and a first pre-estimated impulse response; and
fusing the declipped signal and the third estimated signal to generate an inpainted in-air speech signal.

7. The method of claim 1, wherein inpainting the in-ear speech signal with the second distortion using the in-air speech signal in response to detecting the second distortion comprises:
performing a peak removal processing on the in-ear speech signal to generate a peak-removed signal, in response to detecting the second distortion;
generating a fourth estimated signal based on the in-air speech signal and a second pre-estimated impulse response; and
fusing the peak-removed signal and the fourth estimated signal to generate an inpainted in-ear speech signal.

8. The method of claim 4, wherein the first pre-estimated transfer function is a corresponding mathematical relationship in a frequency domain with a wearer's speech signal collected by the in-ear microphone as input and the wearer's speech signal collected by the in-air microphone as output.

9. The method of claim 5, wherein the second pre-estimated transfer function is a corresponding mathematical relationship in a frequency domain with a wearer's speech signal collected by the in-air microphone as input and the wearer's speech signal collected by the in-ear microphone as output.

10. The method of claim 6, wherein the first pre-estimated impulse response is an impulse response of a corresponding system of a first pre-estimated transfer function in a time domain, wherein the first pre-estimated transfer function is a corresponding mathematical relationship in a frequency domain with a wearer's speech signal collected by the in-ear microphone as input and the wearer's speech signal collected by the in-air microphone as output.

11. The method of claim 7, wherein the second pre-estimated impulse response is an impulse response of a corresponding system of a second pre-estimated transfer function in a time domain, wherein the second pre-estimated transfer function is a corresponding mathematical relationship in a frequency domain with a wearer's speech signal collected by the in-air microphone as input and the wearer's speech signal collected by the in-ear microphone as output.

12. The method of claim 4, wherein the first signal feature includes at least one of amplitude peak, spectral flatness or subband power ratio.

13. The method of claim 5, wherein the second signal feature includes at least one of amplitude peak, spectral flatness, subband spectral flatness or subband power ratio.

14. The method of claim 1, wherein the non-speech pseudo signal is captured by the in-ear microphone and is different from signals captured by the in-air microphone.

15. One or more non-transitory computer-readable media storing instructions that, when executed by one or more processors, cause the one or more processors to detect distortion of speech signals and inpaint the distorted speech signals by performing the steps of:
detecting whether there is a first distortion caused by clipping in an in-air speech signal from an in-air microphone;
detecting whether there is a second distortion caused by a non-speech pseudo signal in an in-ear speech signal from an in-ear microphone, wherein the non-speech pseudo signal is associated with at least one of mouth movement, teeth movement, or swallowing;
inpainting the in-air speech signal with the first distortion using the in-ear speech signal in response to detecting the first distortion; and
inpainting the in-ear speech signal with the second distortion using the in-air speech signal in response to detecting the second distortion.

16. The one or more non-transitory computer-readable media of claim 15, wherein detecting whether there is the first distortion caused by clipping in the in-air speech signal from the in-air microphone comprises:
detecting whether threshold clipping exists in the in-air speech signal, wherein the threshold clipping comprises at least one of single clipping or double clipping; and
detecting whether soft clipping exists in the in-air speech signal.

17. The one or more non-transitory computer-readable media of claim 16, wherein detecting whether the threshold clipping exists in the in-air speech signal comprises:
inputting the in-air speech signal to an adaptive histogram clipping detector; and
in response to detecting that output statistical data of the adaptive histogram clipping detector has high edge values on both sides or one side, determining that the threshold clipping exists in the in-air speech signal.

18. The one or more non-transitory computer-readable media of claim 16, wherein detecting whether the soft clipping exists in the in-air speech signal comprises:
determining a first similarity between the in-air speech signal and a first estimated signal, wherein the first estimated signal is obtained based on the in-ear speech signal and a first pre-estimated transfer function;
extracting a first signal feature from the in-air speech signal; and determining whether the soft clipping exists in the in-air speech signal based on the first similarity and the first signal feature.

19. The one or more non-transitory computer-readable media of claim 15, wherein detecting whether there is the second distortion caused by the non-speech pseudo signal in the in-ear speech signal from the in-ear microphone comprises:

determining a second similarity between the in-ear speech signal and a second estimated signal, wherein the second estimated signal is obtained based on the in-air speech signal and a second pre-estimated transfer function;

extracting a second signal feature from the in-ear speech signal; and determining whether there is the second distortion caused by a non-speech artifact in the in-ear speech signal based on the second similarity and the second signal feature.

20. The one or more non-transitory computer-readable media of claim 15, wherein inpainting the in-air speech signal with the first distortion by using the in-ear speech signal in response to detecting the first distortion comprises:

performing a declipping process on the in-air speech signal to generate a declipped signal in response to detecting the first distortion;

generating a third estimated signal based on the in-ear speech signal and a first pre-estimated impulse response; and fusing the declipped signal and the third estimated signal to generate an inpainted in-air speech signal.

21. A system for detecting distortion of speech signals and inpainting the distorted speech signals, comprising: a memory storing instructions which, when executed by a processor, causes the processor to perform the steps of:

detecting whether there is a first distortion caused by clipping in an in-air speech signal from an in-air microphone;

detecting whether there is a second distortion caused by a non-speech pseudo signal in an in-ear speech signal from an in-ear microphone, wherein the non-speech pseudo signal is associated with at least one of mouth movement, teeth movement, or swallowing;

inpainting the in-air speech signal with the first distortion using the in-ear speech signal in response to detecting the first distortion; and inpainting the in-ear speech signal with the second distortion using the in-air speech signal in response to detecting the second distortion.

* * * * *